No. 625,810. Patented May 30, 1899.
A. SHAPPELL.
HORSE BOOT.
(Application filed Mar. 14, 1899.)
(No Model.)
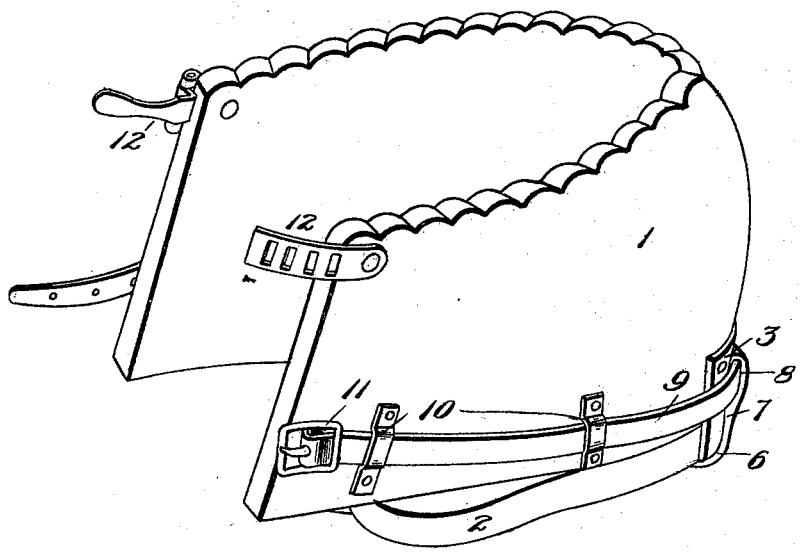
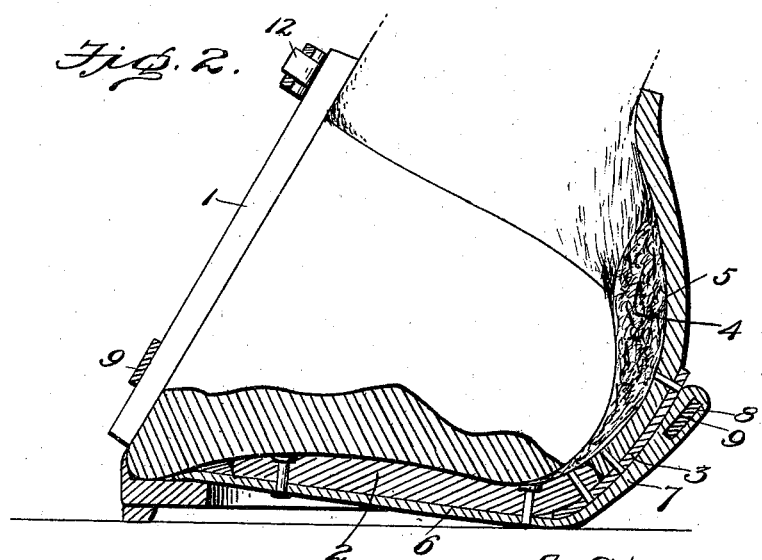
Witnesses
Inventor
A. Shappell
by H. B. Willson & Co.
Attorneys

UNITED STATES PATENT OFFICE.

ABRAHAM SHAPPELL, OF POTTSVILLE, PENNSYLVANIA.

HORSE-BOOT.

SPECIFICATION forming part of Letters Patent No. 625,810, dated May 30, 1899.

Application filed March 14, 1899. Serial No. 709,083. (No model.)

*To all whom it may concern:*

Be it known that I, ABRAHAM SHAPPELL, a citizen of the United States, residing at Pottsville, in the county of Schuylkill and State of Pennsylvania, have invented certain new and useful Improvements in Horse-Boots; and I do declare the following to be a full, clear, and exact description of the invention, such as will enable others skilled in the art to which it appertains to make and use the same.

The invention has relation to horse-boots, and more particularly to that kind known to the art as "soaking" boots.

The object of the invention is to provide a simple, durable, and inexpensive boot of this character which may be easily applied to the horse's hoof and which by its peculiar construction will conduct water toward the frog of the hoof, where it is retained and pressed against the same, rendering the frog soft and pliable and expanding the hoof.

With this object in view the invention consists in certain features of construction and combination of parts, as will be hereinafter fully described and claimed.

In the drawings, Figure 1 is a perspective view of my improved horse-boot; and Fig. 2 is a longitudinal sectional view of the same, showing it in position upon the horse's hoof.

In said drawings, 1 denotes the body portion of the boot, and 2 the tread portion, which is connected to the rear end of the body portion by a hinge 3.

4 denotes a sponge which is secured in a pocket 5 in the rear end of the body portion and fits in the horse's fetlock and is adapted to be moistened with water or medicine.

6 denotes a plate riveted to the tread portion of the boot and having a forwardly-projecting end which fits between the toe of the shoe and the hoof of the horse. The rear end of this plate projects upwardly, as shown at 7, and is provided with a transverse eye 8, through which passes a strap 9, which also passes through loops 10, secured to the sides of the body portion of the boot and which is provided with a fastening-buckle 11.

12 denotes fasteners secured to the upper forward ends or corners of the boot.

When this boot is in place on the horse's foot, the tread portion fits snugly within the frog of the hoof, and being kept moistened all the time by the sponge, which may be easily kept in this moistened condition by pouring the medicine or water upon it, the frog of the foot soon becomes softened and will permit of the hoof expanding into normal size and shape.

By projecting the forward end of the plate between the toe of the shoe and the hoof of the horse and having its rear end connected to the fastening-strap the tread to which the plate is attached is forced upwardly with a firm pressure against the frog of the foot, thereby holding the tread of the shoe into firm engagement with the frog, as well as exerting a pressure to expand the hoof.

Having thus described the invention, what is claimed, and desired to be secured by Letters Patent, is—

A horse-boot comprising the body portion formed in its rear end with a pocket, a sponge located in said pocket, a tread portion hinged to the lower rear end of the body portion, a plate riveted to the under side of the tread portion and having a forwardly-projecting end adapted to fit between the horse's hoof and the toe of the shoe, and having a rear portion formed with a transverse opening or eye, loops secured to the external sides of the body portion, and a fastening-strap extending through said loops and through the eye or aperture of the upwardly-projecting end of the plate, substantially as and for the purpose set forth.

In testimony whereof I have hereunto set my hand in presence of two subscribing witnesses.

ABRAHAM SHAPPELL.

Witnesses:
 H. K. WESTON,
 JOHN J. KOHLER.